US012756901B2

(12) United States Patent
Wang et al.

(10) Patent No.: US 12,756,901 B2
(45) Date of Patent: Oct. 6, 2026

(54) MEDIA CONTENT FAVORITING METHOD AND APPARATUS, ELECTRONIC DEVICE, AND COMPUTER READABLE STORAGE MEDIUM

(71) Applicant: Beijing Bytedance Network Technology Co., Ltd., Beijing (CN)

(72) Inventors: Haiqian Wang, Beijing (CN); Yijie Li, Beijing (CN); Rongrong Zheng, Beijing (CN); Linxing Li, Beijing (CN); Xuyuan Xiang, Beijing (CN); Wen Ruan, Beijing (CN); Yanran Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 146 days.

(21) Appl. No.: 18/550,186

(22) PCT Filed: Mar. 11, 2022

(86) PCT No.: PCT/CN2022/080355
§ 371 (c)(1),
(2) Date: Sep. 12, 2023

(87) PCT Pub. No.: WO2022/188862
PCT Pub. Date: Sep. 15, 2022

(65) Prior Publication Data

US 2024/0171823 A1 May 23, 2024

(30) Foreign Application Priority Data

Mar. 12, 2021 (CN) ......................... 202110270461.0

(51) Int. Cl.
*H04N 21/475* (2011.01)
*H04N 21/845* (2011.01)

(52) U.S. Cl.
CPC ..... *H04N 21/4756* (2013.01); *H04N 21/8456* (2013.01)

(58) Field of Classification Search
None
See application file for complete search history.

(56) References Cited

U.S. PATENT DOCUMENTS

2004/0139047 A1* 7/2004 Rechsteiner ..... H04N 21/47214
2008/0040758 A1 2/2008 Beetcher et al.
(Continued)

FOREIGN PATENT DOCUMENTS

CN 103577060 A 2/2014
CN 103931199 A 7/2014
(Continued)

OTHER PUBLICATIONS

Office action received from Chinese patent application No. 202110270461.0 mailed on Jan. 26, 2024, 15 pages (5 pages English Translation and 10 pages Original Copy).
(Continued)

*Primary Examiner* — Alexander Q Huerta

(57) ABSTRACT

This disclosure discloses a media content favoriting method and apparatus, electronic device, and computer-readable storage medium, relating to the field of media content display interaction. The media content favoriting method includes: playing first media content by a playing control in an interactive interface; displaying a media content favoriting control which comprises a first input area and a media information display area of second media content, the second media content corresponding to a first segment between a first time point of the first media content and a second time point of the first media content, and a duration of the first segment being less than a duration of the first media content; and performing a favoriting operation on the second media
(Continued)

content in response to detecting an input signal from the first input area.

17 Claims, 7 Drawing Sheets

(56) References Cited

U.S. PATENT DOCUMENTS

| | | | | |
|---|---|---|---|---|
| 2011/0075990 | A1* | 3/2011 | Eyer | G11B 27/10 386/E5.003 |
| 2011/0289535 | A1* | 11/2011 | Saffari | G06Q 30/0241 725/61 |
| 2013/0216203 | A1* | 8/2013 | Nakazawa | H04N 9/79 386/241 |
| 2014/0075310 | A1* | 3/2014 | Li | G11B 27/34 715/716 |
| 2016/0100226 | A1* | 4/2016 | Sadler | H04N 21/454 725/38 |
| 2016/0255025 | A1 | 9/2016 | Valverde et al. | |
| 2017/0336955 | A1* | 11/2017 | Cho | H04N 21/4316 |
| 2017/0347143 | A1* | 11/2017 | Limp | H04N 21/4828 |
| 2018/0048937 | A1* | 2/2018 | Gilbert | H04N 21/8405 |

FOREIGN PATENT DOCUMENTS

| | | | |
|---|---|---|---|
| CN | 104679755 | A | 6/2015 |
| CN | 104980773 | A | 10/2015 |
| CN | 106851362 | A | 6/2017 |
| CN | 108304441 | A | 7/2018 |
| CN | 108521593 | A | 9/2018 |
| CN | 108966016 | A | 12/2018 |
| CN | 110958485 | A | 4/2020 |
| CN | 111651111 | A | 9/2020 |
| CN | 112269898 | A | 1/2021 |
| CN | 112637618 | A | 4/2021 |
| CN | 113111220 | A | 7/2021 |
| WO | 2018115878 | A1 | 6/2018 |
| WO | 2018214604 | A1 | 11/2018 |
| WO | 2021012764 | A1 | 1/2021 |

OTHER PUBLICATIONS

International Search Report and Written Opinion for International Application No. PCT/CN2022/080355, mailed May 20, 2022, 13 Pages.

* cited by examiner

MEDIA CONTENT FAVORITING METHOD AND APPARATUS, ELECTRONIC DEVICE, AND COMPUTER READABLE STORAGE MEDIUM

CROSS-REFERENCE TO RELATED APPLICATIONS

The present disclosure is a U.S. National Stage Application under 35 U.S.C. § 371 of International Patent Application No. PCT/CN2022/080355, filed on Mar. 11, 2022, which is based on and claims priority of Chinese application for invention No. 202110270461.0, filed on Mar. 12, 2021, the disclosure of which is hereby incorporated into this disclosure by reference in its entirety.

TECHNICAL FIELD

The present disclosure relates to the field of media content display interaction, and in particular, to a media content favoriting method and apparatus, electronic device, and computer-readable storage medium.

BACKGROUND ART

With a progress of network technology and codec technology, a audio-video based media content distribution market has seen a high growth. The user can obtain various media contents at any time and any place through a terminal device, and the user can record media contents of interest by favoriting the media contents so as to use the media contents added into favorites at any time.

Various media contents are originated from different creative individuals, and thus, the various media contents have rich and diverse forms, for example, the subject matters, expression forms, time lengths and the like of contents may be different.

SUMMARY OF THE INVENTION

This summary is provided to introduce concepts in a simplified form that are further described below in the detailed description of embodiments. The summary of the invention is not intended to identify key features or essential features of the claimed subject matter, nor is it intended to be used to limit the scope of the claimed subject matter.

In a first aspect, an embodiment of the present disclosure provides a media content favoriting method, comprising:

- playing first media content by a playing control in an interactive interface;
- displaying a media content favoriting which comprises a first input area and a media information display area of second media content, the second media content corresponding to a first segment between a first time point of the first media content and a second time point of the first media content, and a duration of the first segment being less than a duration of the first media content; and
- performing a favoriting operation on the second media content in response to detecting an input signal from the first input area.

Further, the first media content comprises first video media content, and the first segment comprises a first video segment of the first video media content; and the second media content corresponding to the first segment of the first media content comprises: the second media content comprising the first video segment; or the second media content comprising first audio content corresponding to the first video segment.

Further, the media content favoriting control further comprises a second input area, and the media content favoriting method further comprises: after playing the first media content by the playing control, playing the first media content by the playing control from the first time point in response to detecting an input signal from the second input area.

Further, the media content favoriting method further comprises: determining a playing time point at which the first media content is played by the playing control in response to detecting an input signal from the second input area; and after playing the first media content by the playing control from the first time point, displaying a cancel control in the playing control, and playing the first media content from the playing time point by the playing control in response to detecting a triggering operation on the cancel control.

Further, the displaying the media content favoriting control comprises: displaying the media content favoriting control in a case where the first media content is played between the first time point and the second time point by the playing control.

Further, the media content favoriting method further comprises: prompting that the second media content is added into favorites through a dynamic effect in response to detecting the input signal from the first input area, and prohibiting the second media content from being played completely when the first media content is played before the second time point by the playing control.

Further, the media content favoriting control further comprises a third input area, and the media content favoriting method further comprises: after playing the first media content by the playing control, displaying a set of media information comprising media information of the second media content in response to detecting an input signal from the third input area.

Further, the media content favoriting method further comprises: after displaying the set of the media information, performing a favoriting operation on third media content in the set of the media information in response to detecting a favoriting operation on the third media content, the third media content corresponding to a second segment between a third time point of the first media content and a fourth time point of the first media content.

Further, the media content favoriting method further comprises: playing the first media content from the third time point by the playing control in response to detecting a play operation on the third media content in the set of the media information, and determining a playing time point of the first media content by the playing control; and after playing the first media content from the third time point, displaying a cancel control in the playing control and playing the first media content from the playing time point by the playing control in response to detecting a triggering operation on the cancel control.

In a second aspect, an embodiment of the present disclosure provides a media content favoriting apparatus, comprising:

- a playing module for playing first media content by a playing control in an interactive interface;
- a display module for displaying a media content favoriting control which comprises a first input area and a media information display area of second media content, the second media content corresponding to a first segment between a first time point of the first media content and a second time point of the first media content, and a duration of the first segment being less than a duration of the first media content; and a processing module for performing a favoriting operation on the second media content in response to detecting an input signal from the first input area.

Further, the first media content comprises first video media content, and the first segment comprises a first video segment of the first video media content; and the second media content corresponding to the first segment of the first media content comprises: the second media content comprising the first video segment; or the second media content comprising first audio content corresponding to the first video segment.

Further, the media content favoriting control further comprises a second input area; the processing module is further configured to: after playing the first media content by the playing control, control the play control to play the first media content from the first time point by the playing module in response to detecting an input signal from the second input area.

Further, the processing module is further configured to determine a playing time point at which the first media content is played by the playing control in response to detecting an input signal from the second input area; the display module is further configured to, after playing the first media content by the playing control from the first time point, display a cancel control in the playing control; and the processing module is further configured to play the first media content from the playing time point by the playing control in response to detecting a triggering operation on the cancel control.

Further, the display module is further configured to display the media content favoriting control in a case where the first media content is played between the first time point and the second time point by the playing control.

Further, the processing module is further configured to prompt that the second media content is added into favorites through a dynamic effect in response to detecting the input signal from the first input area, and prohibit the second media content from being played completely when the first media content is played before the second time point by the playing control.

Further, the media content favoriting control further comprises a third input area; the processing module is further configured to, after playing the first media content by the playing control, display a set of media information comprising media information of the second media content through the display module in response to detecting an input signal from the third input area.

Further, the processing module is further configured to, after displaying the set of the media information, perform a favoriting operation on third media content in the set of the media information in response to detecting a favoriting operation on the third media content, the third media content corresponding to a second segment between a third time point of the first media content and a fourth time point of the first media content.

Further, the processing module is further configured to play, through the playing module, the first media content from the third time point by the playing control in response to detecting a play operation on the third media content in the set of the media information, and determine a playing time point of the first media content by the playing control; and the display module is further configured to, after playing the first media content from the third time point, display a cancel control in the playing control; the processing module is further configured to play the first media content from the playing time point by the playing control in response to detecting a triggering operation on the cancel control.

In a third aspect, an embodiment of the present disclosure provides an electronic device, comprising:

a memory configured to store computer readable instructions; and a processor configured to execute the computer-readable instructions to cause the electronic device to implement the media content favoriting method according to any one of the above first aspects.

In a fourth aspect, embodiments of the present disclosure provide a non-transitory computer-readable storage medium storing computer-readable instructions that, when executed by a computer, cause the computer to implement the media content favoriting method of any embodiments of the above first aspect.

In a fifth aspect, an embodiment of the present disclosure provides a computer program, comprising: instructions which, when executed by a processor, cause the processor to perform the media content favoriting method of any embodiments of the above first aspect.

In a sixth aspect, the present disclosure provides a computer program product comprising instructions which, when executed by a processor, cause the processor to perform the media content favoriting method of any embodiments of the above first aspect.

The foregoing description is only an overview of the technical solutions of the present disclosure, and in order to make the technical means of the present disclosure more clearly understood, the present disclosure may be implemented in accordance with the content of the description, and in order to make the above and other objects, features, and advantages of the present disclosure more clearly understood, the following preferred embodiments are specifically illustrated below, and the detailed description is given in conjunction with the accompanying drawings.

BRIEF DESCRIPTION OF THE DRAWINGS

The above and other features, advantages, and aspects of embodiments of the present disclosure will become more apparent by referring to the following detailed description when taken in conjunction with the accompanying drawings. Throughout the drawings, the same or similar reference numbers refer to the same or similar elements. It should be understood that the drawings are schematic and that elements and components are not necessarily drawn to scale.

DETAILED DESCRIPTION

Figure 1A:
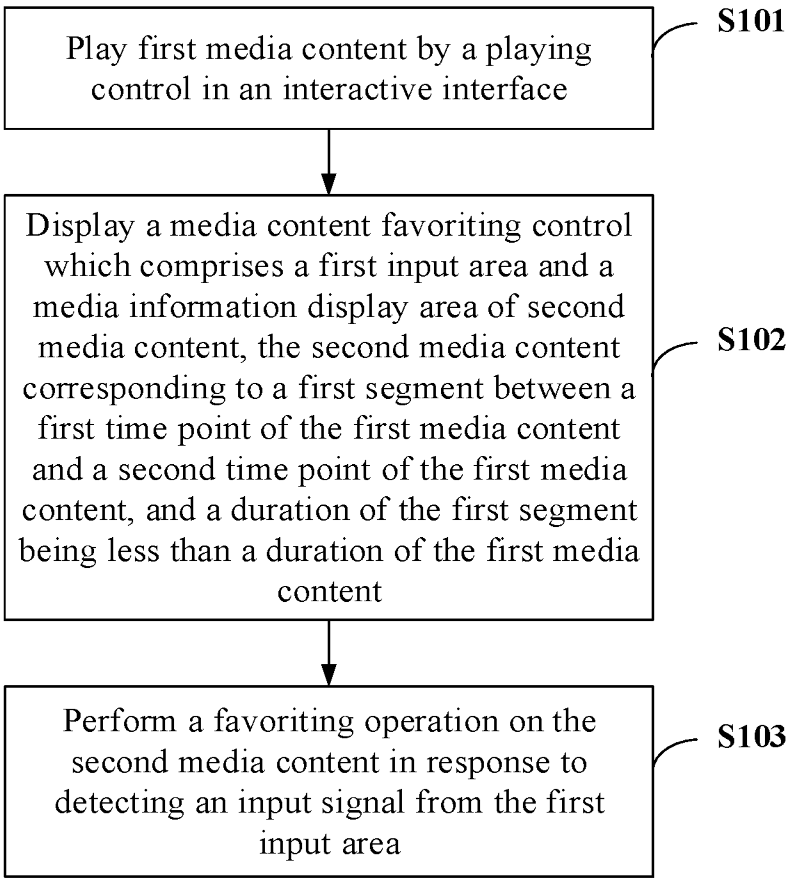
FIG. 1A is a schematic flowchart illustrating a media content favoriting method provided in an embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein, but rather are provided for a more complete and thorough understanding of the present disclosure. It should be understood that the drawings and the embodiments of the disclosure are for illustrative purposes only and are not intended to limit the scope of the disclosure.

It should be understood that the various steps recited in embodiments of the method of the present disclosure may be performed in a different order, and/or performed in parallel. Moreover, method embodiments may include additional steps and/or omit performing the illustrated steps. The scope of the present disclosure is not limited in this respect.

The term "comprising" and variations thereof as used herein is intended to be open-ended, i.e., "comprising but not limited to". The term "based on" means "based at least in part on". The term "one embodiment" means "at least one embodiment"; the term "another embodiment" means "at least one additional embodiment"; the term "some embodiments" means "at least some embodiments". Relevant definitions for other terms will be given in the following description.

It should be noted that the terms "first", "second", and the like in the present disclosure are only used for distinguishing different devices, modules or units, and are not used for limiting the order or interdependence of the functions performed by the devices, modules or units.

It is noted that modifiers "one" or "a plurality of" mentioned in this disclosure are intended to be illustrative rather than limiting, and that those skilled in the art will appreciate that these modifiers shall be interpreted as "one or more" unless clearly indicated otherwise in the context.

For the media contents added into the favorites by the user, the user may only be interested in part of the media contents added in the favorites. When the user uses the media contents added in the favorites, it may be difficult to locate the interested part of the media contents added in the favorites due to forgetting and other reasons, which poses a technical problem of poor use experience.

In order to solve the above technical problem and improve user experience, the embodiment of the present disclosure provides the following technical solutions.

FIG. 1A is a flowchart of an embodiment of a media content favoriting method provided in the present disclosure, which may be executed by a media content favoriting apparatus. The media content favoriting apparatus may be implemented as software or as a combination of software and hardware. As shown in FIG. 1A, the method comprises the following steps.

Step S101: playing first media content by a playing control in an interactive interface.

In step S101, the interactive interface may be displayed on a screen of a terminal device, for example, and the interactive interface may fill the screen or occupy a portion of the screen. The playing control is displayed in the interactive interface, and the first media content is played by the playing control. The first media content may comprise audio and video content, such as video with sound, video without sound, or pure audio. The playing control may fill the interactive interface or occupy a portion of the interactive interface, for example, the playing control may occupy an upper portion of the interactive interface.

Step S102: displaying a media content favoriting control which comprises a first input area and a media information display area of second media content, the second media content corresponding to a first segment between a first time point of the first media content and a second time point of the first media content, and a duration of the first segment being less than a duration of the first media content.

In step S102, the media content favoriting control is displayed, for example, in the interactive interface. The media content favoriting control may be located in or outside the playing control. For example, the media content favoriting control may be located in the middle or lower portion of the interactive interface.

The media content favoriting control comprises the media information display area of the second media content. Optionally, the media information display area may be used to display media information of the second media content. As an example, for example, if the second media content corresponds to a song, the media information display area may display a name, a performer, a duration, and/or a genre of the song; for another example, if the second media content corresponds to a hot topic, the media information display area may display a name, the popularity, an associated transaction, an associated object, and/or an occurrence time of the topic.

The second media content corresponds to the first segment between the first time point of the first media content and the second time point of the first media content, the duration of the first segment being less than the duration of the first media content. The first segment may be a part of the first media content, for example, the first media content comprises a sound video with a total duration of 500 seconds, the first segment comprises a 0th second to 30th second part of the first media content, that is, the second media content corresponds to a first segment between 0th second (first time point) and 30th second (second time point) of the first media content, and the duration of the first segment is 30 seconds, which is less than the duration of 500 seconds of the first media content.

The media content favoriting control also comprises the first input area. When an input operation triggered by a user is received through the first input area, the terminal device can detect an input signal from the first input area.

Step S103: performing a favoriting operation on the second media content in response to detecting an input signal from the first input area.

In a case where the terminal device receives the input operation triggered by the user through the first input area, the input signal is detected from the first input area. In step S103, the terminal device performs the favoriting operation on the second media content in response to detecting the input signal from the first input area. As will be appreciated by those skilled in the art, the favoriting operation may comprise making records of target objects for the convenience of the user to query and browse the target objects added into favorites. As an alternative embodiment, in step S103, in response to detecting the input signal from the first input area, the terminal device may form a record with a name, a summary, a duration, a time at which it was added into favorites, and/or a storage location, etc. corresponding to the second media content. The record can be queried when the user triggers a display of a page of favorites, and the second media content is obtained by performing a corresponding operation on the record.

Optionally, add-to-favorites prompt information is further displayed in the first input area, so that the user can be clear about the operation function corresponding to the first input area. Optionally, the terminal device further prompts the user to perform an add-to-favorites operation through a dynamic effect in response to detecting the input signal from the first input area.

Figure 2:
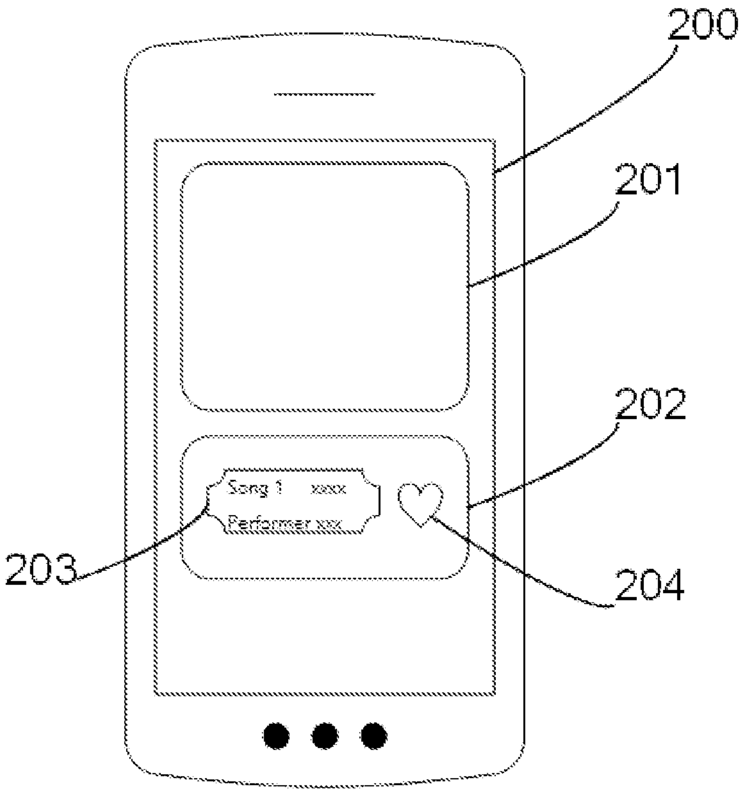
FIG. 2 is a schematic diagram of an interactive interface provided in an embodiment of the present disclosure.

FIG. 2 is a schematic diagram illustrating an interactive interface provided in an embodiment of the present disclosure. As shown in FIG. 2, an interactive interface 200 is displayed on a screen of a terminal device. The interactive interface 200 comprises a playing control 201, and also comprises a media content favoriting control 202 which comprises a media information display area 203 and a first input area 204 of second media content. In FIG. 2, for example, a first media content is played by the playing control 201, media information of the second media content is displayed in the media information display area 203 of the second media content. The second media content corresponds to a song, and the media information such as a song name and a performer of the song is correspondingly displayed in the media information display area 203, and the second media content is added into favorites in response to detecting an input signal corresponding to a trigger operation of a user from the first input area 204. A dynamic effect can be adopted to feedback to the user that the add-to-favorites operation has been performed. For example, the first input area 204 in FIG. 2 indicates that the second media content is not added into favorites by a shape of a blank heart, and the blank heart is filled with color in response to detecting the input signal, so that a feedback is sent to the user concerning that the add-to-favorites operation has been performed on the second media content by a color change through color filling or a dynamic effect.

In an alternative embodiment, the first media content comprises first video media content, and the first segment comprises a first video segment of the first video media content; and the second media content corresponding to the first segment of the first media content comprises: the second media content comprising the first video segment; or the second media content comprising first audio content corresponding to the first video segment.

As an example, the first media content comprises a video with sound with a duration of 500 seconds in total. The first segment comprises a video with sound of the 0th to 30th seconds of the first media content. Correspondingly, the second media content comprises a video with sound of the 0th to 30th seconds of the first media content. In step S301, the terminal device performs an add-to-favorites operation on the 0th to 30th seconds of the first media content in response to detecting an input signal from the first input area.

As another example, the first media content comprises a silent video having a duration of 1 hour in total. The first segment comprises a silent video of the 5th to 8th minutes of the first media content. Correspondingly, the second media content comprises a silent video of the 5th to 8th minutes of the first media content. In step S301, the terminal device performs an add-to-favorites operation on the silent video of the 5th to 8th minutes of the first media content in response to detecting an input signal from the first input area.

As yet another example, the first media content comprises a video with sound with a duration of 20 minutes in total. The first segment comprises a video with sound of the 5th minute to the 30th second of the 10th minute of the first media content. Correspondingly, the second media content comprises an audio of 5 minutes 30 seconds in total from the 5th minute to the 30th second of the 10th minute of the first media content. In step S301, the terminal device performs an add-to-favorites operation on an audio of 5 minutes 30 seconds in total from the 5th minute to the 30th second of the 10th minute of the first media content in response to detecting an input signal from the first input area. For this example, assuming that the first media content comprises a music competition program with a duration of 20 minutes in total, wherein the 5th minute to the 30th second of the 10th minute is a song a performed by singer A and the rest of the 20 minute music competition program are songs performed by other singers, and if the user found that he/she is only interested in song a with a duration of 5 minutes 30 seconds in total performed by singer A, according to the embodiment of the present disclosure, the user can only add the audio of song a performed by the singer A into favorites without needing to add the whole music competition program with a 20 minute duration into favorites, which improves the user's experience.

In an alternative embodiment, the media content favoriting control further comprises a second input area, and after playing the first media content by the playing control, the method further comprises: playing the first media content by the playing control from the first time point in response to detecting an input signal from the second input area.

Figure 1B:
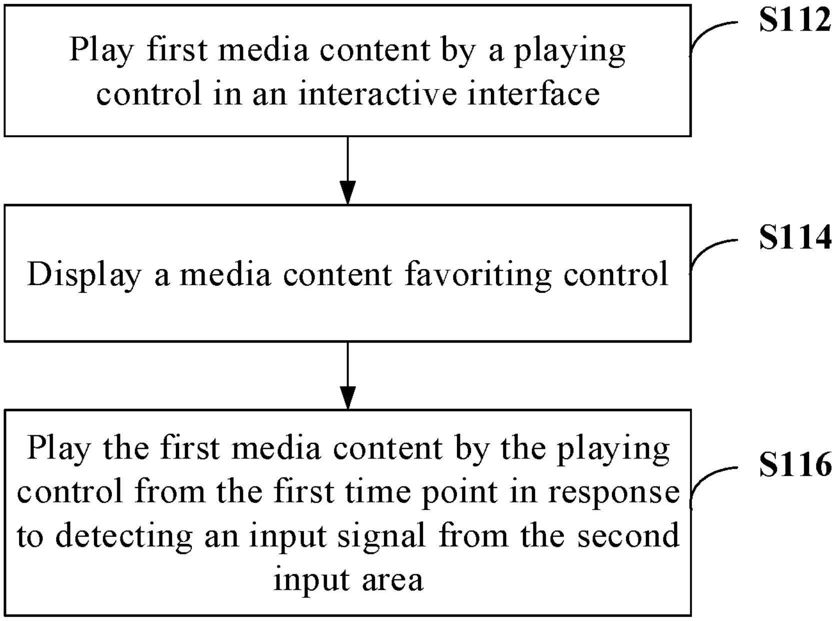
FIGS. 1B and 1C are schematic flow diagrams of a media content playing control method provided in an embodiment of the present disclosure.

FIG. 1B is a flowchart of an embodiment of a media playing control method according to an embodiment of the disclosure. As shown in FIG. 1B, the method comprises the following steps:

- S112: playing first media content by a playing control in an interactive interface;
- S114: displaying a media content favoriting control which comprises a first input area and a media information display area of the second media content and also comprises a second input area;
- S116: playing the first media content by the playing control from the first time point in response to detecting an input signal from the second input area.

In the above embodiment, when the input operation triggered by the user is received through the second input area, the terminal device may detect the input signal from the second input area, and the terminal device plays the first media content from the first time point by the playing control in response to detecting the input signal from the second input area. As mentioned above, the second media content corresponds to the first segment between the first time point of the first media content and the second time point of the first media content. The first input area comprised in the media content favoriting control can be used to trigger the add-to-favorites operation of the second media content. The second media content is associated with the first segment, so that a user may have an interest in the first segment, and thus the second input area is provided in the media content favoriting control. If the user has an interest in the first segment, the input operation can be triggered through the second input area, so that the terminal device plays the first media content from the start position of the first segment, that is, the first time point, by the playing control in the interactive interface.

In an optional embodiment, in response to detecting an input signal from the second input area, the method further comprises: determining a playing time point at which the first media content is played by the playing control; after the playing the first media content by the playing control from the first time point, the method further comprises: displaying a cancel control in the playing control, and playing the first media content from the playing time point by the playing control in response to detecting a triggering operation on the cancel control.

Figure 1C:
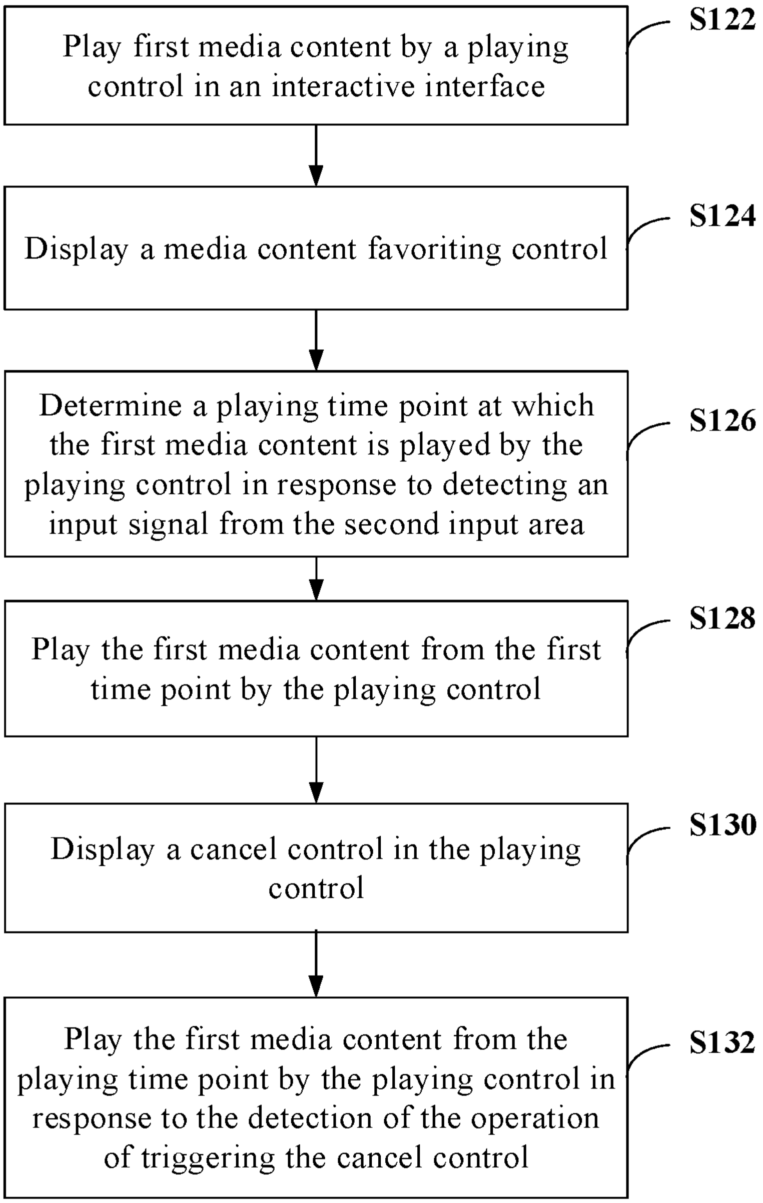

FIG. 1C is a flowchart of an embodiment of a media content playing control method according to an embodiment of the disclosure. As shown in FIG. 1C, the method comprises the following steps.

S122: playing first media content by a playing control in an interactive interface.

S124: displaying a media content favoriting control which comprises a first input area and a media information display area of second media content, and also a second input area.

S126: determining a playing time point at which the first media content is played by the playing control in response to detecting an input signal from the second input area.

The playing time point is, for example, a time point corresponding to detecting the input signal from the second input area.

S128: playing the first media content from the first time point by the playing control.

S130: displaying a cancel control in the playing control.

S132: playing the first media content from the playing time point by the playing control in response to the detection of the operation of triggering the cancel control.

In the process that a user browses the first media content through a playing control in an interactive interface, when browsing to a time point A of the first media content, the playing control is triggered through a second input area in the media content favoriting control to start playing from the first time point of the first media content, that is, a starting time point of the first segment, and the user may wish to continue browsing the first media content from the time point A after browsing the first segment for a certain period of time. So in an optional embodiment, after the user makes the playing control jump to the first time point to play the first media content through triggering operation of the second input area, the cancel control is displayed in the playing control, and after the user triggers operation through the cancel control, the terminal device may control the playing control to start playing the first media content from the previous time point A thereby to enable the user to continue browsing the first media content from the time point A.

In an alternative embodiment, the displaying the media content favoriting control comprises: displaying the media content favoriting control in a case where the first media content is played between the first time point and the second time point by the playing control. As mentioned previously, the media content favoriting control comprises the media information display area and the first input area of the second media content, such that the add-to-favorites operation is performed on the second media content in response to detecting the input signal from the first input area. The second media content is associated with the first segment between the first time point and the second time point. Thus, during the playing of the first media content by the playing control, the media content favoriting control is displayed when the playing is performed to a time point between the first time point (inclusive) and the second time point (inclusive), so that the user can know that the second media content that is likely to be added into favorites is related to the first segment between the first time point and the second time point of the first media content currently being played, thereby stimulating the user's interest in favoriting the second media content.

In another optional embodiment, in response to detecting the input signal from the first input area, the method further comprises: prompting that the second media content is added into favorites through a dynamic effect in response to detecting the input signal from the first input area, and prohibiting the second media content from being played completely when the first media content is played before the second time point by the playing control. As understood by those skilled in the art, there are various forms for distributing media content over a network. For example, when the first media content is on live broadcast, it may be difficult for a user to obtain content that has not been played in advance. For another example, if the first media content is distributed and played, it may be desirable to control the first media content to be played according to a preset schedule rather than to obtain the media content in advance by controlling the schedule of the user. As an example, a server plays first media content for the first time through the network, so that a user may play the first media content with the playing control in the interactive interface through the terminal device. Because the first media content is played for the first time through the network, the user cannot control the play progress, for example, cannot fast forward. For the first media content with a duration of 20 minutes in total, when the first media content is played to the 5th minute (the first time point), singer A starts to sing song a. When the first media content is played to the 6th minute, the user adds song a performed by singer A into favorites through the first input area in the media content favoriting control. At this time, the user is prompted by dynamic effect that various types of song a performed by singer A have been added into favorites, but the user cannot play the complete song a through the page added into favorites, and only until the first media content is played to the 30th second of the 10th minute (the second time point) by the playing control after the singer A finishes song a can the user playback the complete song a through the page added into favorites.

Figure 3:
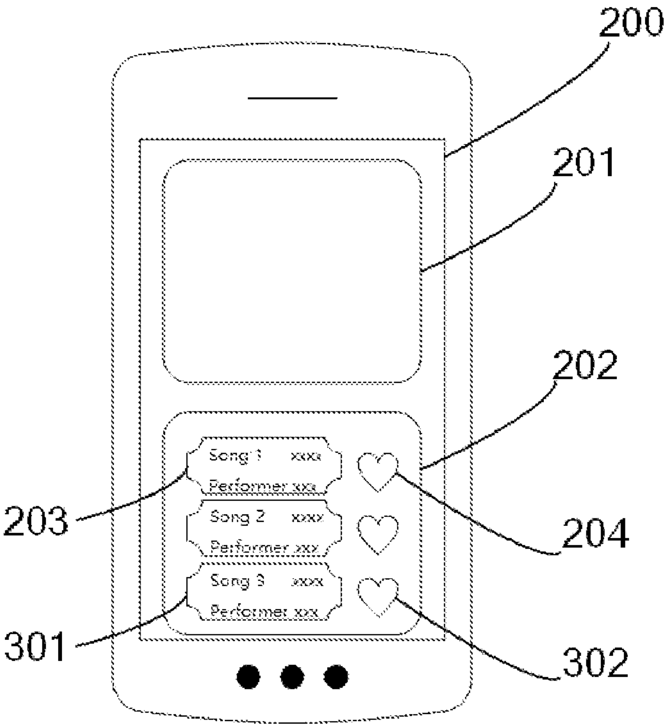
FIG. 3 is a schematic diagram of an interactive interface provided in another embodiment of the present disclosure.

In yet another alternative embodiment, the media content playing control further comprises a third input area; after playing the first media content by the playing control, the method further comprises: displaying a set of media information comprising media information of the second media content in response to detecting an input signal from the third input area. Further optionally, after displaying the set of the media information, the method further comprises: performing a favoriting operation on third media content in the set of the media information in response to detecting a favoriting operation on the third media content, the third media content corresponding to a second segment between a third time point of the first media content and a fourth time point of the first media content. The set of the media information may be displayed, for example, in a form of a list. As an example, the first media content comprises a first segment taking the first time point and the second time point as a starting point and an ending point, respectively, and further comprises a second segment taking the third time point and the fourth time point as a starting point and an ending point, respectively. In particular, the first media content comprises a music competition program with a total time of 20 minutes. The first segment between the first time point, the 5th minute, and the second time point, the 30th second of the 10th minute, is song a performed by singer A. The second segment between the third time point, the 12th minute, and the fourth time point, the 16th minute, is song b performed by singer B. The media content favoriting control originally comprises a media information display area of the second media content to display the media information of the second media content (since the second media content corresponds to the first segment, it is assumed that the media information display area of the second media content presents information of singer A and song a), and also comprises a first input area to make it convenient to add the second media content into favorites, but it is impossible to add the songs of other singers in the music competition program of the first media content into favorites. The third input area is therefore configured in the media content favoriting control. In response to detecting the input signal from the third input area, the set of the media information may be displayed. For example, the media information of the second media content and the media information of the third media content may be displayed in a list manner (since the third media content corresponds to the second segment, it is assumed that the media information of the third media content comprises information of the singer B and the song b). In response to detecting a favoriting operation for the third media content in the set of the media information, the favoriting operation is performed on the third media content, for the convenience of the user to add a plurality of pieces of media content related to the first media content into favorites. FIG. 3 is a schematic diagram of an interactive interface according to another embodiment provided by the present disclosure. As shown in FIG. 3, an interactive interface 200 is displayed on a screen of a terminal device. The interactive interface 200 comprises a playing control 201 and a media content favoriting control 202. Different from FIG. 2, a media information set of media information corresponding to a plurality of pieces of media content is displayed in the media content favoriting control in form of a list. For example, the media information set list of the media content favoriting control 202 comprises a first input area 204 and an information presentation area 203 of second media content, and further comprises an information presentation area 301 and a third input area 302 of third media content. Accordingly, in response to detecting an input signal corresponding to a trigger operation of a user from the first input area 204, the second media content is added into favorites. In response to detecting a favoriting operation of the third media content in the media information set, that is, in response to detecting the input signal corresponding to the trigger operation of the user from the third input area 302, the third media content is added into favorites.

Optionally, the method further comprises: playing the first media content from the third time point by the playing control in response to detecting a play operation on the third media content in the set of the media information, and determining a playing time point of the first media content by the playing control; after playing the first media content from the third time point by the playing control, the method further comprises: displaying a cancel control in the playing control and playing the first media content from the playing time point by the playing control in response to detecting a triggering operation on the cancel control. For the corresponding manner of implementation, refer to the relevant description of the second input area comprised in the media content favoriting control, which is not described herein again.

Figure 1D:
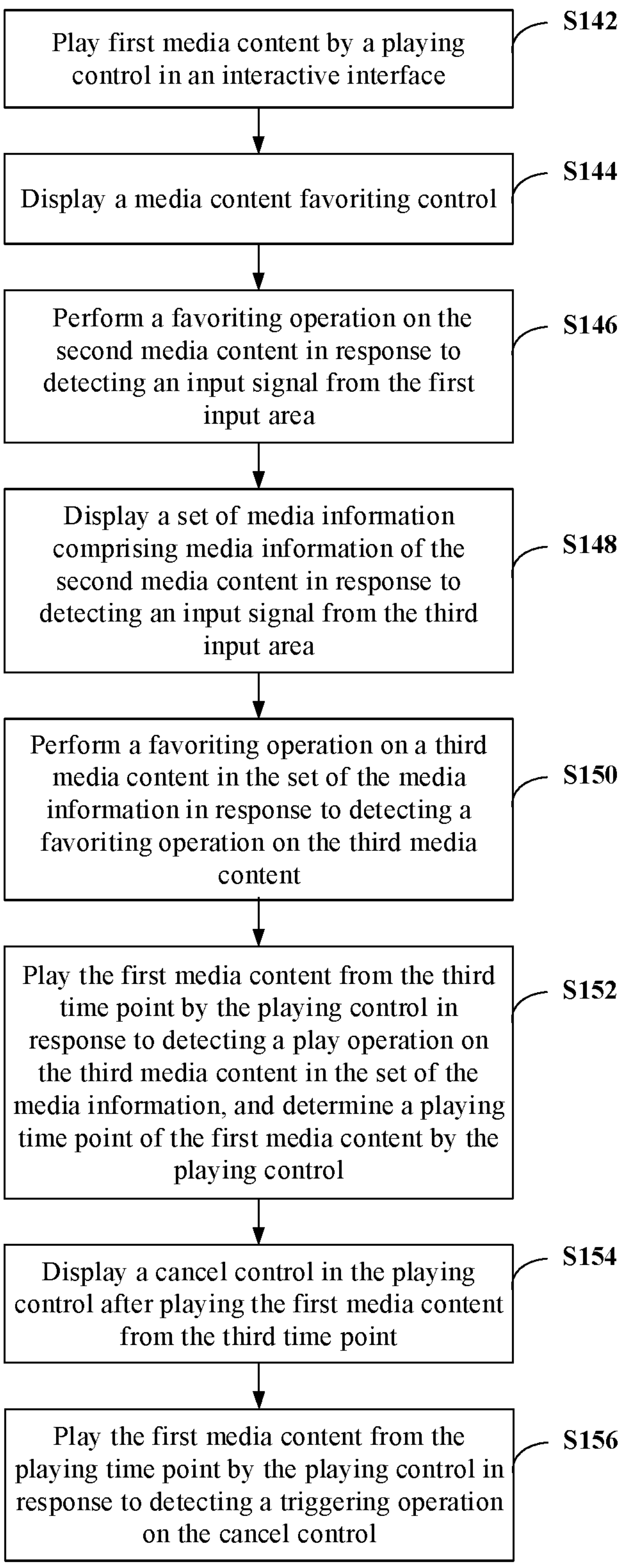
FIG. 1D is a schematic flowchart illustrating a media content favoriting method provided in an embodiment of the present disclosure.

FIG. 1D is a flowchart of an embodiment of a media content favoriting method provided by the present disclosure, which may be executed by a media content favoriting apparatus that may be implemented as software or as a combination of software and hardware. The media content favoriting apparatus may be integrated in one or more devices provided in a computer system, for example, in a terminal device. As shown in FIG. 1D, the method comprises the following steps:

S142: playing first media content by a playing control in an interactive interface;

S144: displaying a media content favoriting control;

S146: performing a favoriting operation on the second media content in response to detecting an input signal from the first input area;

S148: displaying a set of media information comprising media information of the second media content in response to detecting an input signal from the third input area;

S150: performing a favoriting operation on third media content in the set of the media information in response to detecting a favoriting operation on the third media content, the third media content corresponding to a second segment between a third time point of the first media content and a fourth time point of the first media content;

S152: playing the first media content from the third time point by the playing control in response to detecting a play operation on the third media content in the set of the media information, and determining a playing time point of the first media content by the playing control;

S154: displaying a cancel control in the playing control after playing the first media content from the third time point;

S156: playing the first media content from the playing time point by the playing control in response to detecting a triggering operation on the cancel control.

Thus, the user may add into favorites and view a plurality of pieces of media content of interest in the first media content. In the foregoing content, although the steps in embodiments of the above method are described in the aforementioned order, it should be clear to those skilled in the art that the steps in the embodiments of the present disclosure are not necessarily performed in the above order, and they may also be performed in other orders such as in a reverse, parallel or interleaved order, etc. And other steps may also be added on the basis of the above steps, and these obvious modifications or equivalents should also be comprised in the protection scope of the present disclosure, and are not described herein again.

Figure 4:
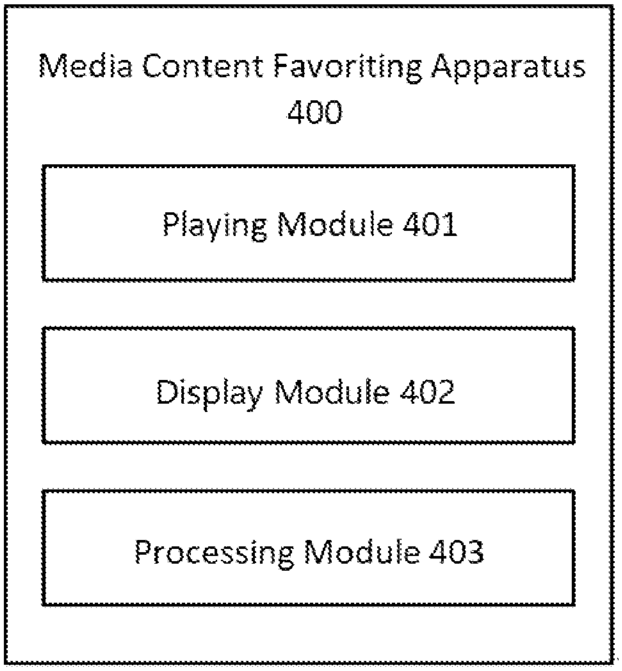
FIG. 4 is a schematic structural diagram of an embodiment of a media content favoriting apparatus provided in an embodiment of the present disclosure.

FIG. 4 is a schematic diagram of an embodiment of a media content favoriting apparatus according to the embodiment of the present disclosure. As shown in FIG. 4, the apparatus 400 comprises: a playing module 401, a display module 402 and a processing module 403, wherein:

the playing module 401 is used for playing first media content by a playing control in an interactive interface;

the display module 402 is used for displaying a media content favoriting control which comprises a first input area and a media information display area of second media content, the second media content corresponding to a first segment between a first time point of the first media content and a second time point of the first media content, and a duration of the first segment being less than a duration of the first media content;

the processing module 403 is used for performing a favoriting operation on the second media content in response to detecting an input signal from the first input area.

Further, the first media content comprises first video media content, and the first segment comprises a first video segment of the first video media content; and the second media content corresponding to the first segment of the first media content comprises: the second media content comprising the first video segment; or the second media content comprising first audio content corresponding to the first video segment.

Further, the media content favoriting control further comprises a second input area; the processing module 403 is further configured to: after playing the first media content by the playing control, control the play control to play the first media content from the first time point by the playing module 401 in response to detecting an input signal from the second input area.

Further, the processing module 403 is further configured to determine a playing time point at which the first media content is played by the playing control in response to detecting an input signal from the second input area; the display module 402 is further configured to, after playing the first media content by the playing control from the first time point, display a cancel control in the playing control; and the processing module 403 is further configured to play the first media content from the playing time point by the playing control in response to detecting a triggering operation on the cancel control.

Further, the display module 402 is further configured to display the media content favoriting control in a case where the first media content is played between the first time point and the second time point by the playing control.

Further, the processing module 403 is further configured to prompt that the second media content is added into favorites through a dynamic effect in response to detecting the input signal from the first input area, and prohibit the second media content from being played completely when the first media content is played before the second time point by the playing control.

Further, the media content favoriting control further comprises a third input area; the processing module 403 is further configured to, after playing the first media content by the playing control, display a set of media information comprising media information of the second media content through the display module 402 in response to detecting an input signal from the third input area.

Further, the processing module 403 is further configured to, after displaying the set of the media information, perform a favoriting operation on third media content in the set of the media information in response to detecting a favoriting operation on the third media content, the third media content corresponding to a second segment between a third time point of the first media content and a fourth time point of the first media content.

Further, the processing module 403 is further configured to play, through the playing module 401, the first media content from the third time point by the playing control in response to detecting a play operation on the third media content in the set of the media information, and determine a playing time point of the first media content by the playing control; and the display module 402 is further configured to, after playing the first media content from the third time point, display a cancel control in the playing control; the processing module 403 is further configured to play the first media content from the playing time point by the playing control in response to detecting a triggering operation on the cancel control.

The apparatus shown in FIG. 4 can perform the method of the embodiment shown in FIG. 1, and reference may be made to the related description of the embodiment shown in FIG. 1 for a part of this embodiment that is not described in detail. For the implementation process and technical effect of the technical solution, refer to the description in the embodiment shown in FIG. 1, which will not be described herein again.

Figure 5:
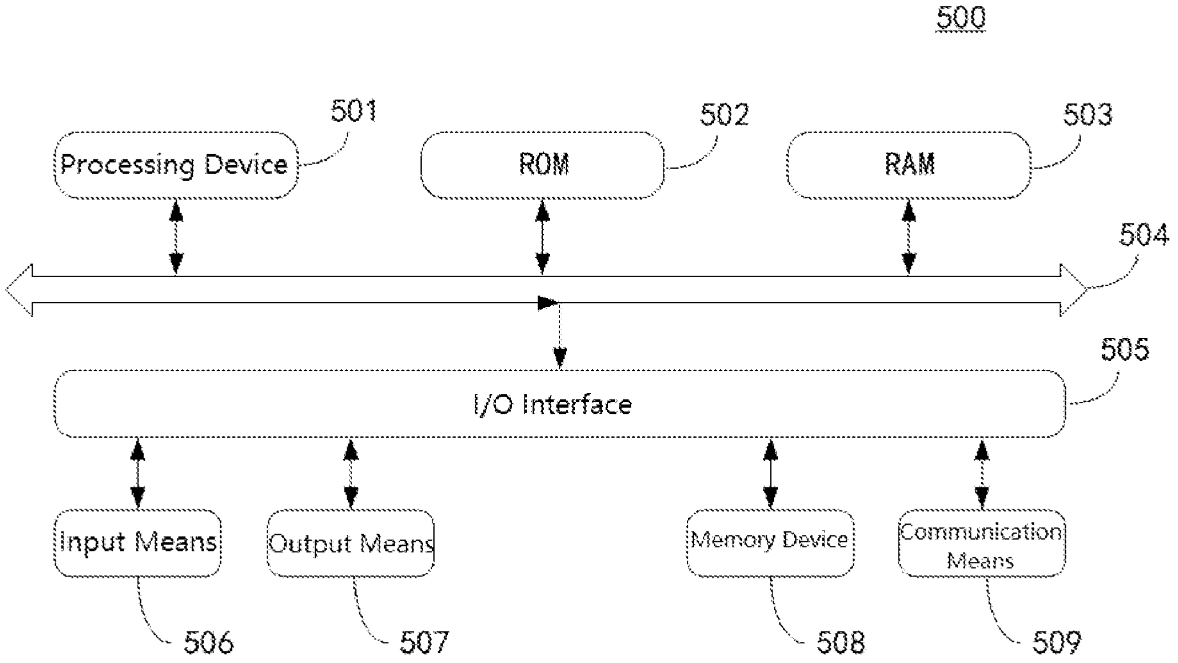
FIG. 5 is a schematic structural diagram of an electronic device provided in an embodiment of the present disclosure.

Referring now to FIG. 5, shown is a schematic diagram of an electronic device 500 suitable for use in implementing embodiments of the present disclosure. The terminal device in the embodiments of the present disclosure may include, but is not limited to, a mobile terminal such as a mobile phone, a notebook computer, a digital broadcast receiver, a PDA (personal digital assistant), a PAD (tablet computer), a PMP (portable multimedia player), a vehicle terminal (e.g., a vehicle navigation terminal), and the like, and a fixed terminal such as a digital TV, a desktop computer, and the like. The electronic device shown in FIG. 5 is only an example, and should not bring any limitation to the functions and the scope of use of the embodiments of the present disclosure.

As shown in FIG. 5, electronic device 500 may include a processing device (e.g., a central processing unit, graphics processor, etc.) 501 that may perform various appropriate actions and processes in accordance with a program stored in a Read Only Memory (ROM) 502 or a program loaded from a memory device 508 into a Random Access Memory (RAM) 503. In the RAM 503, various programs and data necessary for the operation of the electronic apparatus 500 are also stored. The processing device 501, the ROM 502, and the RAM 503 are connected to each other through a communication line 504. An input/output (I/O) interface 505 is also connected to communication line 504.

Generally, the following devices may be connected to the I/O interface 505: input means 506 including, for example, a touch screen, touch pad, keyboard, mouse, camera, microphone, accelerometer, gyroscope, etc.; an output means 507 including, for example, a Liquid Crystal Display (LCD), a speaker, a vibrator, and the like; a memory device 508 including, for example, magnetic tape, hard disk, etc.; and a communication means 509. The communication means 509 may allow the electronic device 500 to communicate with other devices in a wireless or wired manner to exchange data. While FIG. 5 illustrates an electronic device 500 having various means, it is to be understood that not all illustrated means are required to be implemented or provided. More or fewer devices may be alternatively implemented or provided.

In particular, the processes described above with reference to the flow diagrams may be implemented as computer software programs, according to embodiments of the present disclosure. For example, the embodiments of the present disclosure include a computer program product comprising a computer program carried on a non-transitory computer readable medium, the computer program containing program code for performing the method illustrated by the flow chart. In such an embodiment, the computer program may be downloaded and installed from a network via the communication means 509, or installed from the memory device 508, or installed from the ROM 502. The computer program, when executed by the processing device 501, performs the above-described functions defined in the methods of the embodiments of the present disclosure.

It should be noted that the computer readable medium of the present disclosure may be a computer readable signal medium or a computer readable storage medium or any combination of the two. A computer readable storage medium may be, for example, but not limited to, an electronic, magnetic, optical, electromagnetic, infrared, or semiconductor system, apparatus, or device, or any combination of the foregoing. More specific examples of the computer readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage means, a magnetic storage means, or any suitable combination of the foregoing. In the present disclosure, a computer readable storage medium may be any tangible medium that can contain, or store a program for use by or in connection with an instruction execution system, apparatus, or device. In contrast, in the present disclosure, a computer readable signal medium may include a data signal in baseband or as part of a carrier wave, which carries computer readable program code. Such a propagated data signal may take any of a variety of forms, including, but not limited to, an electro-magnetic signal, an optical signal, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to: electrical wires, optical cables, RF (radio frequency), etc., or any suitable combination of the foregoing.

In some embodiments, the clients and servers may communicate using any currently known or future developed network Protocol, such as HTTP (HyperText Transfer Protocol), and may be interconnected with any form or medium of digital data communication (e.g., a communication network). Examples of communication networks include a local area network ("LAN"), a wide area network ("WAN"), the International network (e.g., the Internet), and peer-to-peer networks (e.g., ad hoc peer-to-peer networks), as well as any currently known or future developed network.

The computer readable medium may be embodied in the electronic device; or may be separate and not incorporated into the electronic device.

The computer readable medium carries one or more programs which, when executed by the electronic device, cause the electronic device to: perform the media content favoriting method in the above embodiment.

Computer program code for carrying out the operations of the present disclosure may be written in any combination of one or more programming languages, including but not limited to an object oriented programming language such as Java, Smalltalk, C++, including conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the case of executing on a remote computer, the remote computer may be connected to the user's computer through any type of network, including a local area network (LAN) or a wide area network (WAN), or the connection may be made to an external computer (for example, through the Internet using an Internet service provider).

The flowchart and block diagrams in the figures illustrate the architecture, functionality, and operation of possible implementations of the systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units described in the embodiments of the present disclosure may be implemented by software or hardware, wherein the name of an element does not in some cases constitute a limitation on the element itself.

The functions described herein above may be performed, at least in part, by one or more hardware logic components. For example, without limitation, exemplary types of hardware logic components that may be used include: field programmable gate arrays (FPGAs), application specific integrated circuits (ASICs), application specific standard products (ASSPs), system on a chip (SOCs), complex programmable logic devices (CPLDs), and the like.

In the context of this disclosure, a machine-readable medium may be a tangible medium that can contain, or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of a machine-readable storage medium would include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage means, a magnetic storage means, or any suitable combination of the foregoing.

According to one or more embodiments of the present disclosure, there is provided an electronic device comprising: at least one processor; and a memory communicatively coupled to the at least one processor; wherein the memory stores instructions executable by the at least one processor to enable the at least one processor to perform any one of the media content favoriting methods.

According to one or more embodiments of the present disclosure, there is provided a non-transitory computer-readable storage medium storing computer instructions for causing a computer to perform any of the media content favoriting methods.

The foregoing description is only exemplary of the preferred embodiments of the disclosure and is illustrative of the principles of the technology employed. It will be appreciated by those skilled in the art that the scope of the disclosure herein is not limited to the particular combination of features described above, but also encompasses other combinations of features described above or equivalents thereof without departing from the spirit of the disclosure. For example, the above features and the technical features disclosed in the present disclosure (but not limited to) having similar functions are replaced with each other to form the technical solution.

What is claimed is:

1. A media content favoriting method, comprising:

playing first media content by a playing control in an interactive interface;

displaying a media content favoriting control which comprises a first input area and a media information display area of second media content in a case where the first media content is played between a first time point and a second time point by the playing control, the second media content corresponding to a first segment between the first time point of the first media content and the second time point of the first media content, a duration of the first segment being less than a duration of the first media content, the second media content is first audio content corresponding to a first video segment, and the first input area being for triggering a favoriting operation of the second media content; and performing the favoriting operation on the second media content in response to detecting an input signal from the first input area;

the media content favoriting control further comprises a second input area, and the media content favoriting method further comprises:

after playing the first media content by the playing control, playing the first media content by the playing control from the first time point in response to detecting an input signal from the second input area;

determining a playing time point at which the first media content is played by the playing control in response to detecting the input signal from the second input area; and after playing the first media content by the playing control from the first time point, displaying a cancel control in the playing control, and playing the first media content from the playing time point by the playing control in response to detecting a triggering operation on the cancel control.

2. The media content favoriting method of claim 1, wherein:

the first media content comprises first video media content, and the first segment comprises a first video segment of the first video media content.

3. The media content favoriting method of claim 1, further comprising:

prompting that the second media content is added into favorites through a dynamic effect in response to detecting the input signal from the first input area, and prohibiting the second media content from being played completely when the first media content is played before the second time point by the playing control.

4. The media content favoriting method of claim 1, wherein the media content favoriting control further comprises a third input area, and the media content favoriting method further comprises:

after playing the first media content by the playing control, displaying a set of media information comprising media information of the second media content in response to detecting an input signal from the third input area.

5. The media content favoriting method of claim 4, further comprising:

after displaying the set of the media information, performing a favoriting operation on third media content in the set of the media information in response to detecting a favoriting operation on the third media content, the third media content corresponding to a second segment between a third time point of the first media content and a fourth time point of the first media content.

6. The media content favoriting method of claim 5, further comprising:

playing the first media content from the third time point by the playing control in response to detecting a play operation on the third media content in the set of the media information, and determining a playing time point of the first media content by the playing control; and after playing the first media content from the third time point, displaying a cancel control in the playing control and playing the first media content from the playing time point by the playing control in response to detecting a triggering operation on the cancel control.

7. An electronic device, comprising:

a memory configured to store computer readable instructions; and a processor configured to execute the computer-readable instructions to cause the electronic device to implement a media content favoriting method comprising:

playing first media content by a playing control in an interactive interface;

displaying a media content favoriting control which comprises a first input area and a media information display area of second media content in a case where the first media content is played between a first time point and a second time point by the playing control, the second media content corresponding to a first segment between the first time point of the first media content and the second time point of the first media content, a duration of the first segment being less than a duration of the first media content, the second media content is first audio content corresponding to a first video segment, and the first input area being for triggering a favoriting operation of the second media content; and performing the favoriting operation on the second media content in response to detecting an input signal from the first input area;

the media content favoriting control further comprises a second input area, and the media content favoriting method further comprises:

after playing the first media content by the playing control, playing the first media content by the playing control from the first time point in response to detecting an input signal from the second input area;

determining a playing time point at which the first media content is played by the playing control in response to detecting the input signal from the second input area; and after playing the first media content by the playing control from the first time point, displaying a cancel control in the playing control, and playing the first media content from the playing time point by the playing control in response to detecting a triggering operation on the cancel control.

8. The electronic device of claim 7, wherein:

the first media content comprises first video media content, and the first segment comprises a first video segment of the first video media content.

9. The electronic device of claim 7, wherein the media content favoriting control further comprises a second input area, and the processor is configured to, after playing the first media content by the playing control, play the first media content by the playing control from the first time point in response to detecting an input signal from the second input area.

10. The electronic device of claim 9, wherein the processor is configured to:

determine a playing time point at which the first media content is played by the playing control in response to detecting an input signal from the second input area; and after playing the first media content by the playing control from the first time point, display a cancel control in the playing control, and play the first media content from the playing time point by the playing control in response to detecting a triggering operation on the cancel control.

11. The electronic device of claim 7, wherein the processor is configured to:

display the media content favoriting control in a case where the first media content is played between the first time point and the second time point by the playing control.

12. The electronic device of claim 7, wherein the processor is configured to:

prompt that the second media content is added into favorites through a dynamic effect in response to detecting the input signal from the first input area, and prohibit the second media content from being played completely when the first media content is played before the second time point by the playing control.

13. The electronic device of claim 7, wherein the media content favoriting control further comprises a third input area, and the processor is configured to:

after playing the first media content by the playing control, display a set of media information comprising media information of the second media content in response to detecting an input signal from the third input area.

14. The electronic device of claim 13, wherein the processor is configured to:

after displaying the set of the media information, perform a favoriting operation on third media content in the set of the media information in response to detecting a favoriting operation on the third media content, the third media content corresponding to a second segment between a third time point of the first media content and a fourth time point of the first media content.

15. The electronic device of claim 14, wherein the processor is configured to:

play the first media content from the third time point by the playing control in response to detecting a play operation on the third media content in the set of the media information, and determine a playing time point of the first media content by the playing control;

after playing the first media content from the third time point, display a cancel control in the playing control and playing the first media content from the playing time point by the playing control in response to detecting a triggering operation on the cancel control.

16. A non-transitory computer-readable storage medium storing computer-readable instructions that, when executed by a computer, cause the computer to implement the media content favoriting method comprising:

playing first media content by a playing control in an interactive interface;

displaying a media content favoriting control which comprises a first input area and a media information display area of second media content in a case where the first media content is played between a first time point and a second time point by the playing control, the second media content corresponding to a first segment between the first time point of the first media content and the second time point of the first media content, a duration of the first segment being less than a duration of the first media content, the second media content is first audio content corresponding to a first video segment, and the first input area being for triggering a favoriting operation of the second media content; and performing the favoriting operation on the second media content in response to detecting an input signal from the first input area;

the media content favoriting control further comprises a second input area, and the media content favoriting method further comprises:

after playing the first media content by the playing control, playing the first media content by the playing control from the first time point in response to detecting an input signal from the second input area;

determining a playing time point at which the first media content is played by the playing control in response to detecting the input signal from the second input area; and after playing the first media content by the playing control from the first time point, displaying a cancel control in the playing control, and playing the first media content from the playing time point by the playing control in response to detecting a triggering operation on the cancel control.

17. The non-transitory computer-readable storage medium of claim 16, wherein:

the first media content comprises first video media content, and the first segment comprises a first video segment of the first video media content.

* * * * *